US010790962B2

(12) United States Patent
Rietman et al.

(10) Patent No.: US 10,790,962 B2
(45) Date of Patent: Sep. 29, 2020

(54) DEVICE AND METHOD TO COMPUTE A BLOCK CIPHER

(71) Applicant: KONINKLIJKE PHILIPS N.V., Eindhoven (NL)

(72) Inventors: Ronald Rietman, Eindhoven (NL); Maarten Peter Bodlaender, Eindhoven (NL); Sebastiaan Jacobus Antonius De Hoogh, Oosterhout (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 16/319,018

(22) PCT Filed: May 31, 2018

(86) PCT No.: PCT/EP2018/064321
§ 371 (c)(1),
(2) Date: Jan. 18, 2019

(87) PCT Pub. No.: WO2018/224382
PCT Pub. Date: Dec. 13, 2018

(65) Prior Publication Data
US 2020/0092081 A1 Mar. 19, 2020

(30) Foreign Application Priority Data
Jun. 9, 2017 (EP) .................... 17175161

(51) Int. Cl.
H04L 29/06 (2006.01)
H04L 9/06 (2006.01)
H04L 9/00 (2006.01)

(52) U.S. Cl.
CPC ............ H04L 9/0631 (2013.01); H04L 9/004 (2013.01); H04L 2209/12 (2013.01); H04L 2209/16 (2013.01); H04L 2209/24 (2013.01)

(58) Field of Classification Search
CPC .............................. H04L 9/0631; H04L 9/004
(Continued)

(56) References Cited

U.S. PATENT DOCUMENTS 8,386,791 B2 2/2013 Bevan et al.
2002/0184488 A1* 12/2002 Amini ................ H04L 63/0442
713/153
(Continued)

FOREIGN PATENT DOCUMENTS

WO    2017080769 A1    5/2017

OTHER PUBLICATIONS

Biham et al: "Differnetial Fault Analysis of Secret Key Cryptosystems"; Advances in Cryptology-Crypto '97, LNCS 1294, pp. 513-525, 1997.
(Continued)

Primary Examiner — Anthony D Brown

(57) ABSTRACT

Some embodiments are directed to a cryptographic device (100) arranged to compute a block cipher on an input message (110). The device computes a plurality of intermediate block cipher results by computing and re-computing a first intermediate block cipher result (151) of the plurality of intermediate block cipher results by applying the plurality of block cipher rounds sequentially to the input message followed by one or more additional block cipher rounds. A plurality of averaging functions are applied to the plurality of intermediate block cipher results, the results of which are added, after which the inverse of the one or more additional block cipher rounds is applied.

20 Claims, 8 Drawing Sheets

(58) Field of Classification Search
USPC .......................................................... 380/28
See application file for complete search history.

(56) References Cited

U.S. PATENT DOCUMENTS

2014/0229744 A1* 8/2014 Doumen ............... G06F 21/121
  713/190
2016/0048689 A1 2/2016 Wiener

OTHER PUBLICATIONS

Joye et al: "Strengthening Hardware AES Implementations Against Fault Attacks"; IET Inf. Secur. vol. 1, No. 3, pp. 106-110, Sep. 2007.
Park et al: "A Fault-Resistant AES Implementation Using Differential Characteristic of Input and Output"; The Journal of Supercomputing, March 2014, pp. 615-634.

* cited by examiner

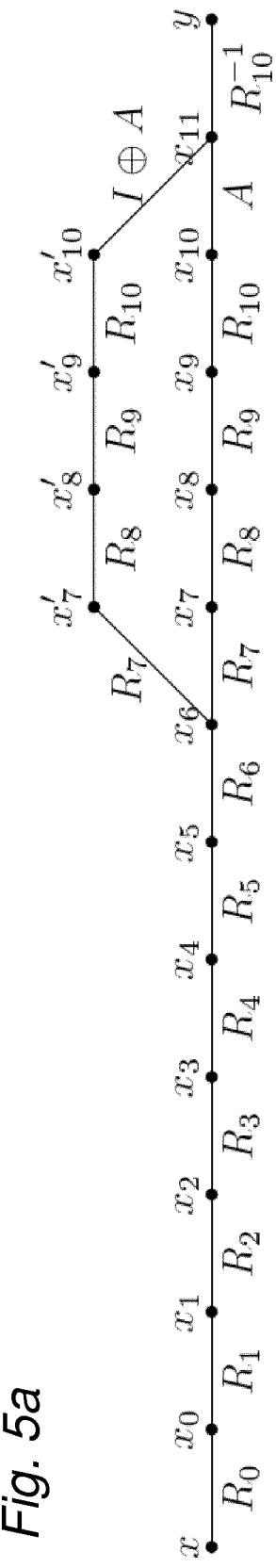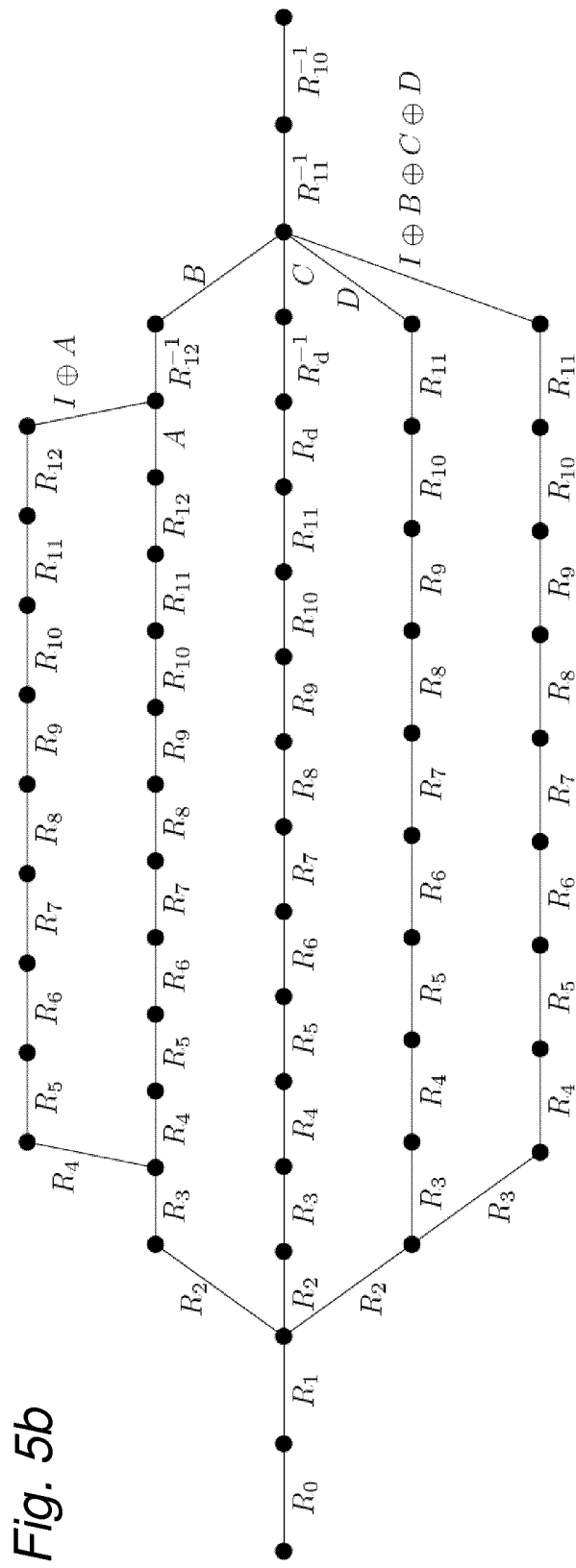

DEVICE AND METHOD TO COMPUTE A BLOCK CIPHER

CROSS-REFERENCE TO PRIOR APPLICATIONS

This application is the U.S. National Phase application under 35 U.S.C. § 371 of International Application No. PCT/EP2018/064321, filed on May 31, 2018 which claims the benefit of European Patent Application No. 17175161.3, filed on Jun. 9, 2017. These applications are hereby incorporated by reference herein.

FIELD OF THE INVENTION

The invention relates to a cryptographic device arranged to compute a block cipher, a cryptographic method arranged to compute a block, and a computer readable medium.

BACKGROUND OF THE INVENTION

In the paper "A White-Box DES Implementation for DRM Applications" by S. Chow, et al. a white-box implementation of the Data Encryption Standard (DES) is presented (referred to as 'Chow' below and incorporated by reference herein). A white-box implementation is a cryptographic implementation designed to withstand an attack in the white-box context. In the white-box context, the attacker has total visibility into software implementation and execution. Nevertheless, even so the white-box implementation aims to prevent the extraction of secret keys from the program.

Chow forms an implementation of DES that consists entirely of table look-up operations. Through several intermediate methods, the normal cipher is transformed to an implementation in this form, so that a table-network can be used to compute DES. By encoding the tables in the table-network the system's resistance against analysis and attack is increased.

Although a white-box implementation using a table-network is hard to analyze, a table based implementation of block cipher may still be vulnerable to some attacks. The inventors realized that even if a key may not be directly derived from observing the variables in a white-box implementation, access to the variables may be used to execute an attack previously only known from the realm of physical attacks.

For example, in the paper "Differential Fault Analysis of Secret Key Cryptosystems" by Biham, et al. transient faults are introduced in a smart card by changing the power supply voltage causing a DES computation to produce an incorrect result. By analyzing the errors that result from the transient fault, information on the secret key is obtained.

The inventor had the insight that such physical fault attacks may be adapted to attack a white-box implementation. Even if it were not possible to obtain secret information from analysis of variables visible to the attacker, the attacker may be able to derive secret information by modifying encoded variables to try to emulate the physical attack. The intentional modification of variables acts as the transient fault. Indeed, it turns out that white-box implementations which resist other attacks specific for the white-box model, e.g., memory scraping, collision attacks, may still be vulnerable to a fault attack.

Countermeasures introduced in the prior art against differential fault attacks proved ineffective in the white-box model; for example, in U.S. Pat. No. 8,386,791B2, 'Secure data processing method based particularly on a cryptographic algorithm', incorporated herein by reference. The block cipher DES is applied to input data twice. The results of the two computations are then compared. If they are unequal, a fault has been detected.

In the white-box model this countermeasure is easily circumvented. For example, one may disable the second execution, or the comparison, or one may introduce the same fault in both copies of DES. There is a need for a new DFA countermeasures which can be better protected when attacked in the white box model.

SUMMARY OF THE INVENTION

A device is proposed to compute a block cipher. Block cipher results are computed multiple times and the results are combined. By inserting additional block cipher rounds before and after the combination step it is ensured that faults spread out in the block cipher result. This construction reduces the information that can be derived from the observed final output after introducing faults anywhere in the program. A fault that is introduced by an attacker in a key-dependent round of the block cipher appears less directly in the block cipher result. Thus, an attacker has less opportunity to derive information therefrom, thus complicating DFA attacks.

An alternative way in which fault attacks could be prevented is to jointly compute the re-computation together with the initial computation using jointly encoded variables, e.g., in which variables that are used in the initial computation are jointly encoded with variables used in the re-computation. This results in large tables in a table-driven implementation or many polynomial coefficients in a polynomial implementation. Such joint encoding is not necessary in embodiments though. As a result, smaller implementations become possible, e.g., with smaller tables.

Another advantage of embodiments according to the invention is more efficient spreading, since in the present invention any block cipher round after the fault adds to the spreading of the fault over the block cipher result. It is not only the additional block cipher rounds that contribute to the spreading, but any round after the fault, including any conventional rounds of the block cipher. As a result, fewer additional rounds are needed.

The block cipher device is an electronic device. For example, it may be a mobile electronic device, e.g., a mobile phone. The device may be a set-top box, smart-card, computer, etc. The device and method of computing a block cipher described herein may be applied in a wide range of practical applications. Such practical applications include: digital rights management, financial applications, computer security, and the like.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code stored on a computer readable medium for performing a method according to the invention when said program product is executed on a computer.

In a preferred embodiment, the computer program comprises computer program code adapted to perform all the steps of a method according to the invention when the computer program is run on a computer. Preferably, the computer program is embodied on a computer readable medium.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1a schematically shows an example of an embodiment of a cryptographic device, FIG. 1b schematically shows an example of an embodiment of a cryptographic device, FIG. 1c schematically shows an example of an embodiment of a cryptographic device, FIG. 2 schematically shows an example of an embodiment of a cryptographic device, FIG. 3 schematically shows an example of an embodiment of a cryptographic method, FIG. 4 schematically shows an example of a conventional block cipher calculation, FIG. 5a schematically shows an example of an embodiment of a block cipher calculation, FIG. 5b schematically shows an example of an embodiment of a block cipher calculation, FIG. 6a schematically shows a computer readable medium having a writable part comprising a computer program according to an embodiment, FIG. 6b schematically shows a representation of a processor system according to an embodiment.

LIST OF REFERENCE NUMERALS, IN FIGS. 1-2

Figure 1A:
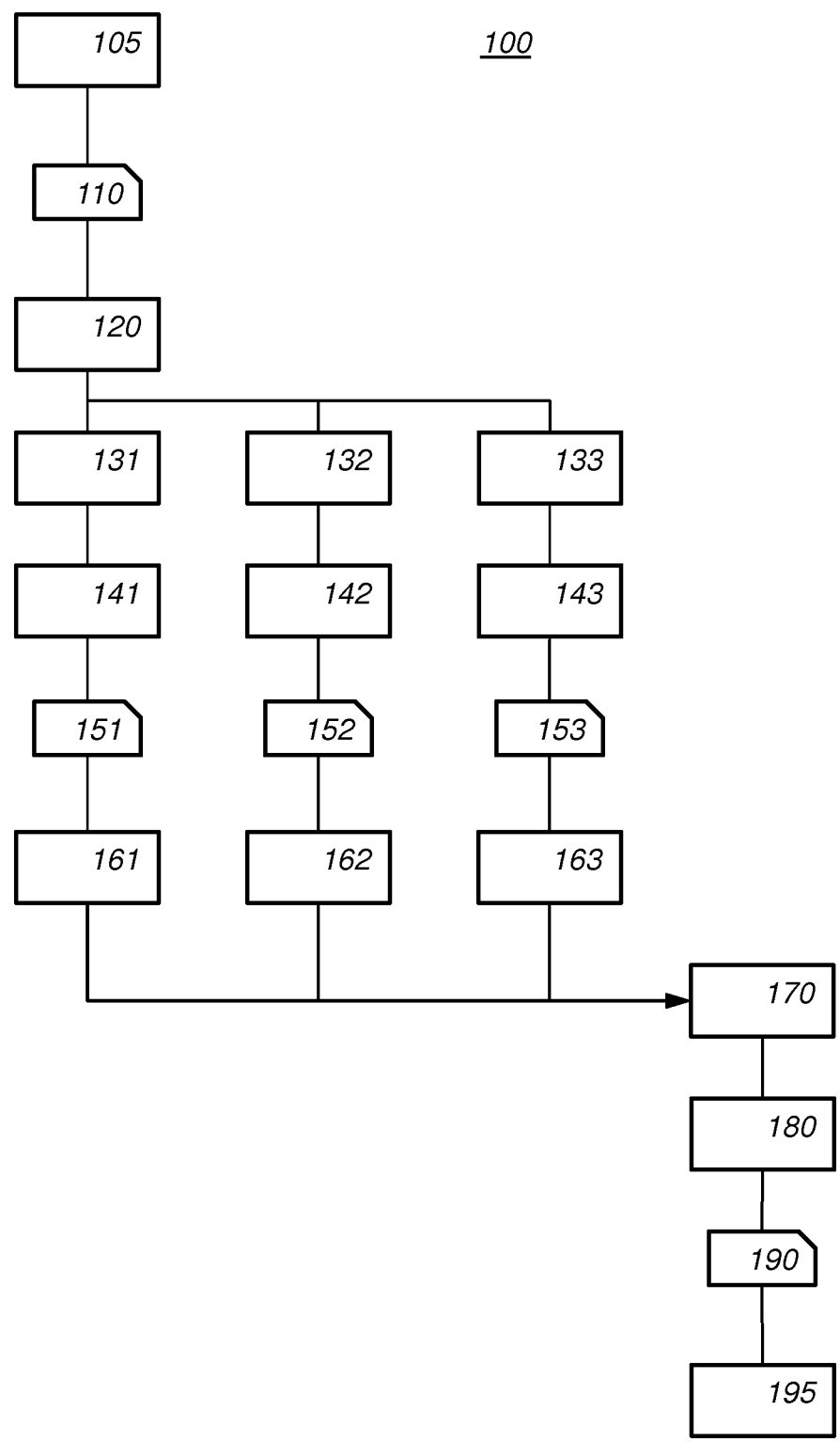

100, 101, 102 a cryptographic device
105 an input interface
110 an input message
120, 121, 122 an initial block cipher round unit
131, 132, 133, a final block cipher round unit
141, 142, 143 an additional block cipher round unit
151, 152, 153 an intermediate block cipher result
161, 162, 163 an averaging function unit
170 an adding unit
180 an inverse additional block cipher round unit
190 a block cipher result
195 an output interface
200 a cryptographic device
231, 232 a final block cipher round unit
241, 242 an additional block cipher round unit
246, 247 a further additional block cipher round unit
251, 252 a further intermediate block cipher result
261, 262 a further averaging function unit
270 an adding unit
280 an inverse further additional block cipher round unit

DETAILED DESCRIPTION OF THE EMBODIMENTS

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

Figure 4:
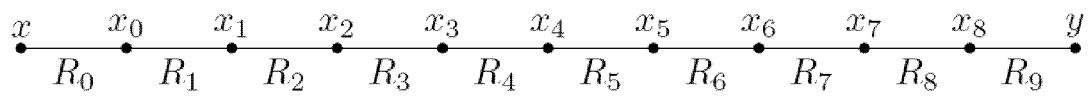

FIG. 4 represents a conventional calculation that transforms input x into output y by consecutively applying the round functions $R_0$, $R_1$, K, $R_9$. The intermediate states are denoted $x_0 K$, $x_8$. In this particular example there are 10 rounds, like in AES-128, but similar graphs can be drawn for calculations that use a different number of rounds, like AES-192 (12 rounds), AES-256 (14 rounds) or DES (16 rounds). In all these calculations, the round functions are public functions that depend on a round key.

An attacker who is faced with an implementation of this calculation, for instance a computer program, might be able to read the round keys from the computer memory while the program is running. However, the programmer can defend against this memory scraping attack by encoding all variables, in particular the round keys, in the program. The attacker could try to reverse engineer the encoding and thus retrieve the round key, but typically there are easier methods to extract the key, that do not require reverse engineering. The DFA attack is one of these methods.

In a DFA attack the attacker inserts a fault, i.e., changes a variable, somewhere in the program, and observes the effect of this change on the output. How the output changes may reveal part of the round key of the last round.

To make this more concrete, we return to the example of AES-128, depicted in FIG. 4. There are 10 rounds and 11 round keys $k_0$, $k_1$, K, $k_{10}$. The calculation of the output y from the input x proceeds as follows:

$x_0 = R_0(x)$ $x_1 = R_1(x_0)$ $x_2 = R_2(x_1)$ $x_3 = R_3(x_2)$ $x_4 = R_4(x_3)$ $x_5 = R_5(x_4)$ $x_6 = R_6(x_5)$ $x_7 = R_7(x_6)$ $x_8 = R_8(x_7)$ $y = R_9(x_8)$, where for rounds 0 to 8 the round function is given by $R_i(x) = \text{MixColumns}(\text{ShiftRows}(\text{SubBytes}(x \oplus k_i)))$ for $0 \leq i \leq 8$, and the last round function $R_9$ is given by $R_9(x) = \text{ShiftRows}(\text{SubBytes}(x \oplus k_9)) \oplus k_{10}$.

If the attacker changes a program variable that encodes a single byte from the last round, say a byte of $x_8$, $k_9$ or $k_{10}$, then the two outputs differ in a single byte and no information about the key is revealed. If the attacker changes a variable that encodes a single byte from one of the rounds 0 up to 7, then the entire output changes and it is not practical to derive information about any of the round keys. But if the attacker changes a variable that encodes a single byte of the penultimate round, say a byte of $x_7$ or $k_8$, then the outputs y (without fault injection) and y* (with fault injection) differ in four of the sixteen bytes (due to the MixColumns operation), and for these outputs it must hold that InverseMixColumns(InverseSubBytes(InverseShiftRows($y \oplus k_{10}$))) and InverseMixColumns(InverseSubBytes(InverseShiftRows($y^* \oplus k_{10}$)))

differ in exactly one byte. This constrains the possible values of the four bytes of $k_{10}$ in the positions where y and y* differ. Applying a different change to the same program variable will give different constraints for the same four bytes, and typically only a few such fault injections are needed to determine the four bytes of $k_{10}$ uniquely. The other bytes of $k_{10}$ are found by DFA attacks on different variables in round 8.

FIG. 1a schematically shows an example of an embodiment of a cryptographic device 100. Cryptographic device 100 is configured to compute a block cipher. Device 100 comprises an input interface 105 configured to receive an input message on which the block cipher is to be computed. There are many input interfaces suitable to receive an input message in the device, examples thereof being given herein. Device 100 also comprises a processor circuit. The processor circuit is arranged to process the received input message to obtain an output message that represents the block cipher result.

The execution of the block cipher is implemented in the processor circuit, examples of which are shown herein. FIGS. 1a, 1b, 1c and 2 show functional units that may be functional units of the processor circuit. For example, FIG. 1a may be used as a blueprint of a possible functional organization of the processor circuit. The processor circuit is not shown separate from the units in FIG. 1a. For example, the functional units shown in FIG. 1a may be wholly or partially be implemented in computer instructions that are stored at device 100, e.g., in an electronic memory of device 100, and are executable by a microprocessor of device 100. In hybrid embodiments, functional units are implemented partially in hardware, e.g., as coprocessors, e.g., crypto coprocessors, and partially in software stored and executed on device 100.

Block ciphers work by applying multiple invertible rounds sequentially to the input data. For example, an internal state may be maintained. A next internal state is obtained from a current internal state by applying the next round to the current internal state. An initial internal state is derived from the input message. The block cipher result is obtained from a final internal state. For example, a block cipher round may increase confusion and diffusion in the internal state. Confusion and diffusion are two properties of block cipher rounds, originally identified by Claude Shannon. Even if the confusion and diffusion caused by a block cipher is limited, using multiple bock ciphers their effects are compounded. For example, a block cipher round may comprise multiple functions applying on the internal state; at least one of which is configured to increase confusion, e.g., an s-box or an array of s-boxes, and at least one of which is configured to increase diffusion, e.g., a permutation or linear transformation of the internal state.

For most of the examples, we will use the block cipher AES. The Advanced Encryption Standard (AES) is described in Advanced Encryption Standard, Federal Information Processing Standards Publication 197, 2001. However, embodiments can use any block cipher that uses multiple rounds, e.g., SLT type block ciphers (Substitution/Linear Transformation, also known as Substitution-permutation network (SPN)), such as AES (Rijndael), 3-Way, Kuznyechik, PRESENT, SAFER, SHARK, Square, etc., but also Feistel type block ciphers, e.g., DES, 3DES, etc.

The input message 110 received by input interface 105 may be in plain format or encoded, e.g., encoded according to a secret encoding. For example, in the case of AES the input message may be an unencoded 16-byte message. The block cipher implemented in device 100 comprises a plurality block cipher rounds which are to be applied to the input message. Device 100 comprises an initial block cipher round unit 120 and a final block cipher round unit 131. Together initial block cipher round unit 120 and final block cipher round unit 131 comprise all rounds of the block cipher. For example, initial block cipher round unit 120 may be arranged to perform an initial part of the block cipher rounds and final block cipher round unit 131 may comprise a final part of the block cipher rounds. The two parts do not need to comprise the same number of rounds. It is known that the final rounds of a block cipher are more vulnerable to DFA attacks. The rounds that are to be protected against DFA attacks are in the final block cipher round unit 131 whereas the rounds for which no known DFA attack exists can go into initial block cipher round unit 120. For example, if the block cipher has 10 rounds, the initial 7 rounds may be performed in initial block cipher round unit 120 whereas the final 3 rounds may be done in final block cipher round unit 131.

In an embodiment of the invention, the block cipher rounds may operate on encoded data, e.g. using a conventional white box technology. For example, block cipher rounds may operate on internal states which are encoded. For example, the internal data, e.g., the internal state may comprise multiple data elements, e.g., bytes, or nibbles, each of which is encoded. For example, the encoding may be secret encodings, e.g., private to device 100. For example, the encoding may be chosen at compile time. In principle, any data element in any round may be encoded using a different encoding. However, some reuse is possible. For example, some rounds may use the same encodings as other rounds. This in turn may lead to a reduction of the size of the implementation. Encoding may use various additional measures to improve the security. For example, the encoded data element may be larger than the unencoded element. For example, the encoding may use multiple shares, the sum of which is the encoded data element. The individual shares may be individually encoded. For example, a data element may be jointly encoded with redundant data, e.g., a salt value, so that multiple different encoded values represent the same plain data value.

A white-box implementation may operate on encoded data using look-up tables, matrix multiplication and the like. A white-box implementation may also be implemented using multiple inter-related polynomials, e.g., over a finite field.

For example, an encoding round may be performed before the first block cipher round to encode the input message. For example, a decoding round may be performed after the last block cipher round. In this way, the device 100 can operate on encoded data even if the input and output are not encoded. For example, in an embodiment the block cipher is configured to a decrypting operation, e.g., as part of a digital rights management application (DRM). Using device 100 the DRM application can decrypt content, nevertheless the user is not able to extract the key with which the content is encrypted. For example, in an embodiment the block cipher is configured for an encryption operation, e.g., as part of a financial application in which the block cipher may be used to sign messages, e.g. using a MAC, such as CBC-MAC. Even though the user is capable of signing messages, he is not able to extract the signing key.

Interestingly, a white-box implementation of a block cipher may be used to create asymmetric cryptographic system out of block ciphers. For example, a white-box implementation of a block-cipher encryption operation may be published so that anyone can encrypt data with it, yet only those who know the secret key used in the block-cipher implementation can decrypt.

Device 100 further comprises an additional block cipher round unit 141. The additional block cipher rounds may for example, be the same as the rounds of the block cipher implemented by device 100, albeit with a different, e.g., unrelated, e.g., random round key. The additional block cipher rounds do not necessarily have to be rounds of the same block cipher though. For example, in an embodiment the block cipher rounds implemented by the additional block cipher round unit 141 cause additional confusion and/or diffusion in the internal state so that a fault attack in the rounds of final block cipher round unit 131 are spread out. A fault in those rounds is spread out by the subsequent rounds in units 131 (if any), unit 141 and unit 161 (see below). The amount a fault is spreaded can be increased by increasing the number of block cipher rounds in the additional block cipher round units. By increasing this number of rounds, it can be assured that a fault spread out to even the full internal state. For example, such a high bar could be quantified by requiring that the probability of any particular bit flipping in the final (plain) output as a result of flipping a single bit a round of unit 131 is 50%+/−a threshold. The threshold may be say 10%, or 1%, etc. The probability of flipping may be established by experiment.

For example, a round of unit 141 may consist of a combination of an s-box array, operating on the data-elements, say bytes of the internal state, followed by a random but fixed linear transform of the entire internal state. The latter is an example of a block cipher round in which no explicit key is needed.

Note that at the end of unit 131 the result of the block cipher is computed, although in the encoded domain. For an attacker, this is not visible though. At the end of unit 141 the correct result has been distorted. At this point, a first intermediate block cipher result 151 has been computed. For someone with knowledge of the implementation, e.g., of the block cipher rounds used in unit 141, the encodings used, etc., one could reconstruct the outcome of the block cipher from intermediate block cipher result 151, even without knowledge of the key used by the block cipher.

Effective protection against other white-box attacks, e.g., attacks in which variables are only observed not modified, may be based on shares. For example, a variable x may be represented as a tuple $x_i$ which represents the variable. For example, one may have $x=\Sigma_{i=1 \ldots k} x_i$, in case there are k shares. The variable x may be a data element, e.g., a byte of an internal state. All data elements, e.g., bytes, of the internal state may be represented in this manner. The individual shares may be implemented in the white-box program in encoded form, $E_i(x_i)$, for some bijection $E_i$. A white-box implementation with shares is less sensitive to some advanced white-box attacks, such as collision attacks. Embodiments add DFA protection to such an implementation for relatively little additional costs, e.g., without adding too much to execution time or table size.

In an embodiment, share based representations are used in the initial rounds, e.g., in unit 120, but not in the later rounds, e.g., in units 131, 132, 133, etc. An advantage of this is that the relatively expensive shares are used in fewer rounds. The collision attacks are less advantageous in later rounds, whereas DFA attacks are less advantageous in earlier rounds, so this reduces cost, in particular table size, without giving up much in security.

Figure 1B:
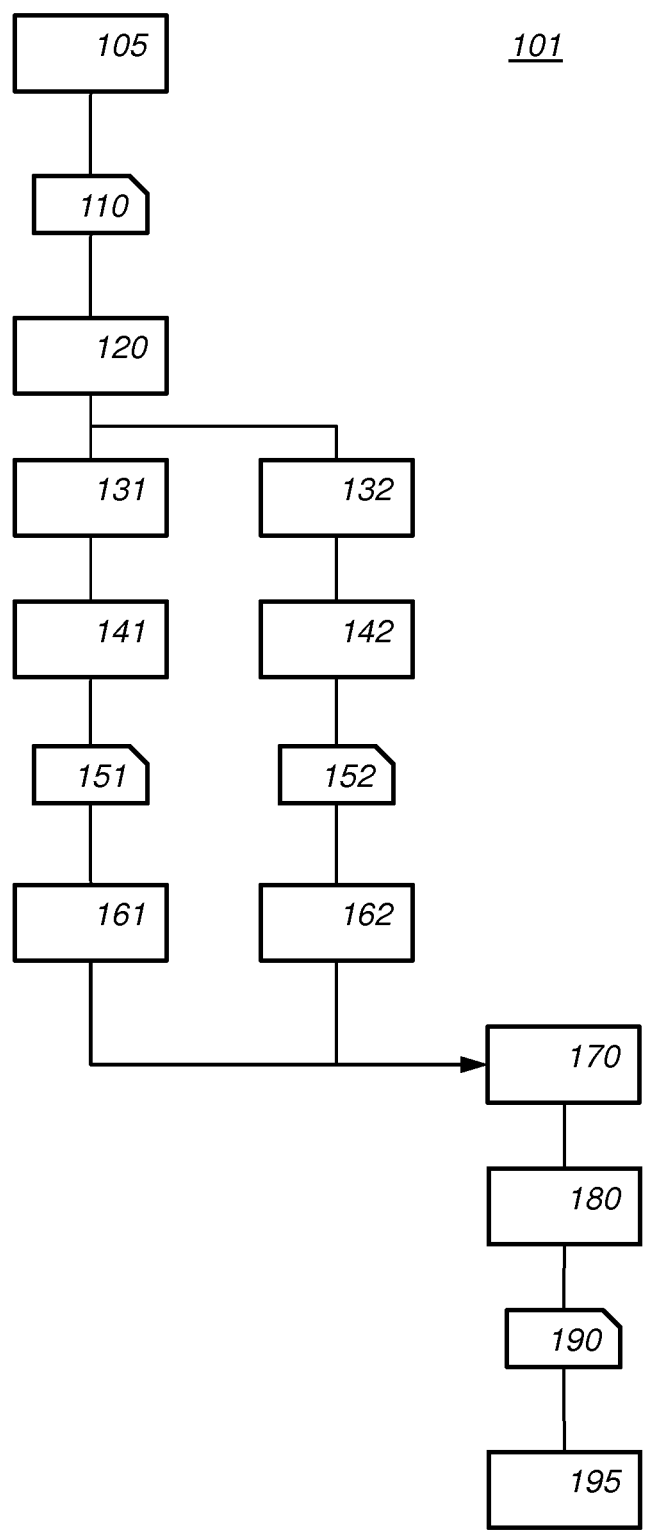

Device 100 is configured to compute further intermediate block cipher results. Shown in FIG. 1a are two further intermediate block cipher results: intermediate block cipher results 152 and 153. It is possible to compute more than two further intermediate block cipher results. FIG. 1b shows an embodiment in which only one further intermediate block cipher result is computed.

To compute the further intermediate block cipher results, device 100 comprises further final block cipher round units. Shown in FIG. 1a are final block cipher round units 132 and 133. Initial block cipher round unit 120 and any one of the further final block cipher round units comprise all rounds of the block cipher. The further final block cipher round units, e.g. units 132 and 133 compute the same block cipher rounds as final block cipher round unit 131 though they will typically do so in a different encoding. The further final block cipher round units thus re-compute at least one of the final block cipher rounds of the plurality block cipher rounds, e.g., the rounds of unit 131. At the end of the units 132 and 133 the block cipher result is available although in an encoding, and they should all be equal to the result of unit 131 if there were no faults.

Following the further final block cipher round units 132 and 133 the one or more additional block cipher rounds of unit 141 are applied. Shown in FIG. 1a are further additional block cipher round units 142 and 143, following units 132 and 133 respectively. The further additional block cipher round units perform the same block cipher rounds as additional block cipher round unit 141. The result of the further additional block cipher round units are the further intermediate block cipher result 152 and 153. Apart from a different encoding, and assuming no faults occurred, all intermediate block cipher results, e.g. results 151, 152 and 153, would be equal.

Device 100 further comprises averaging function units. Shown in FIG. 1a are averaging function units 161, 162, and 163. The averaging function units apply a corresponding plurality of averaging functions to the plurality of intermediate block cipher results. The plurality of averaging functions having been selected so that their function-sum equals the identity function. For example, if we denote the averaging functions as $f_i$, and their inputs as x, the requirement is that $\Sigma_i f_i(x)=x$. For example, a function $f_1$ could be implemented by averaging function unit 161, a function $f_2$ could be implemented by averaging function unit 162, and a function $f_3$ could be implemented by averaging function unit 163. If there are three averaging function units, we may have that $f_1(x)+f_2(x)+f_3(x)=x$.

The averaging functions may be chosen in a variety of ways. For example, some or even all but one of the plurality of averaging functions may be selected randomly from a larger set of averaging functions. The final averaging function may be computed as the function-difference of the identity function and said selected averaging functions. For example, one may define a final function $f_k(x)=x-\Sigma_{i=1}^{k-1} f_i(x)$, assuming there are k averaging functions.

Various choices for the larger set of averaging functions are advantageous. For example, one may select the averaging functions as functions that act component-wise on the data-elements in the intermediate block cipher results. For example, if an intermediate block cipher result is a sequence of data-elements, e.g. bytes, $x=x_1\|\ldots\|x_i$, an averaging function may be defined as $f(x)=g_1(x_1)\|\ldots\|g_1(x_i)$ Another possibility is to select the averaging functions as linear operations. For example, linear operations acting on the intermediate block cipher results. In this case, the intermediate block cipher results may be regarded as a sequence of data-elements, say bytes, and the linear operations may be regarded as a matrix in the corresponding finite field, e.g., $F_{256}$ in the case of bytes. In particular, the linear operation may be regarded as a matrix operating on the bits in the intermediate block cipher result, e.g., a matrix over $F_2$.

Yet a further option for selecting the averaging functions is to select them from polynomials with a pre-determined maximum degree, e.g. degree 2 polynomials. It is known, per se, how to implement polynomial functions on byte-wise encoded values.

Note that the averaging functions may be implemented using the same white-box technology as the rounds implemented in the various block cipher round units. For example, the averaging functions may be implemented as a table network, a sequence of polynomial operations, etc.

Although not required for correct operation, it is preferred that at least one of the plurality of averaging functions is invertible. It is even preferred if all of the plurality of averaging functions are invertible. For example, one may randomly select invertible functions for most of the averaging functions, and compute a final averaging function therefrom. If the final averaging function is determined not to be invertible, some or all of the other averaging function may be selected again, until all functions are invertible.

The results of the averaging functions are added in an adding unit 170. The type of addition is the same as the addition used in the definition of the averaging function. In an embodiment, adding unit 170 uses the XOR operation; other addition operations are possible though, e.g., natural byte-wise arithmetical addition. Because of how the averaging functions are chosen, the result of the addition will be the same as the output of any one of the additional block cipher round units, e.g., the same as any one of the intermediate block cipher results. If a fault occurred in any one of the plurality of intermediate block cipher result computations, it will result in a distorted final block cipher result.

For example, consider a fault in unit 133. Any block cipher round following the fault, e.g., in unit 133, 143, and 180 contribute to spreading the fault over the block cipher result. As the fault affects a larger and larger part of the final block cipher result, it becomes harder for an attacker to derive useful information from the fault. Ideally, a fault affects all of the bits in the final block cipher result. That is, ideally, for any bit in the final block cipher result there is a positive probability that it changes as a result of the fault.

Device 100 comprises an inverse additional block cipher round unit 180. Unit 180 performs the inverse of the block cipher rounds of the additional block cipher round units, obtaining block cipher result 190. If no faults occurred, this will be the correct block cipher result. If desired the inverse additional block cipher round unit 180 can also undo the encodings, so that correct block cipher result 190 is plain. An output interface 195 may be configured to transmit the block cipher result 190.

To obfuscate where the block cipher rounds are computed, an embodiment may include one or more dummy rounds. Dummy rounds may be included in any of the block cipher rounds. In particular, dummy rounds may be included in the final block cipher round units, the additional block cipher round units, and possibly even in the averaging function units. As dummy rounds, one could perform one or move actual bock cipher rounds, possibly with a different round key, followed by the inverse of the bock cipher rounds. A dummy round could also be a round that perform an identity operations, e.g., only changing the encoding from one form to another.

As noted above, in a white-box implementation most or all of the intermediate data will be in encoded form. In particular, the intermediate block cipher results will be encoded. Interestingly, in an embodiment, different intermediate block cipher results are not jointly encoded. For example, intermediate block cipher result 151 is encoded independent of intermediate block cipher result 152 and 153. This is advantageous as joint encodings require larger tables. In an embodiment, joint encoding is not used for any variable.

Besides the white-box model, there are other attack models. A cryptographic primitive is called secure in the black-box model, if an attacker who only has knowledge of the inputs and outputs of the primitive cannot elevate his rights, e.g., obtain secret keys, encrypt messages, decrypt messages, etc. However, in practice attackers often do not operate in the black-box model, and in fact have more information than just the inputs and outputs. For example, in the grey-box model, it is assumed that an attacker has access to some information related to the execution of the primitive. These additional sources of information are called 'side-channels'. For example, side-channels include the amount of time that an operation took, or the amount of power that was consumed, etc. The white-box model is a related, but even stronger model, since an attacker has full access to all internal variables of the primitive.

The deliberate introduction of faults is as much a problem in grey-box as in white-box. Accordingly, if only grey-box prevention is needed, e.g., because white-box type attacks are unavailable or too expensive given the attacker's resources one may use embodiments described herein. In this case, some of the white-box countermeasures, such as encoding all of the variables may be dispensed with. However, the advantage of distorting the result of fault attacks remains, so that an attacker cannot make interferences about the key on the basis of the observed output before and after a fault.

FIG. 1b schematically shows an example of an embodiment of a cryptographic device 101. Device 101 is similar to device 100 except that fewer intermediate block cipher results are computed; in FIG. 1b two intermediate block cipher results are computed: results 151 and 152. As a result, the averaging functions 161 and 162 are also adapted. These averaging functions are chosen, so that their function-sum equals the identity. Note that having more intermediate block cipher results than shown in FIG. 1a is also possible, e.g., by adding more branches such as the branch 132, 142, 162 and the branch 133, 143, 163. If the number of branches and the number of intermediate block cipher results is changed the averaging functions are changed accordingly.

Figure 1C:
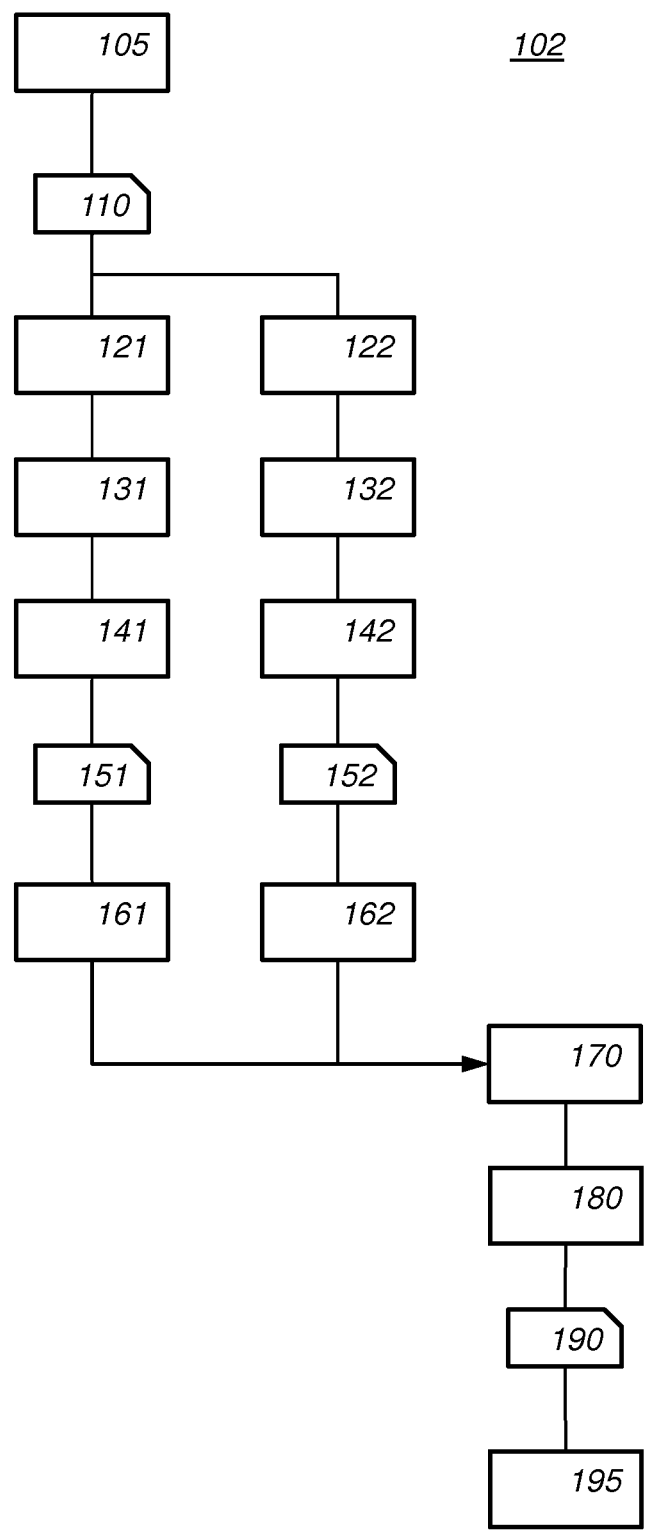

FIG. 1c schematically shows an example of an embodiment of a cryptographic device 102. Device 102 is similar to device 100 except that all rounds of the block cipher are recomputed not just a number of final rounds. Device 102 comprises initial block cipher round unit 121 and 122. Units 121 and 122 perform the same computation as initial block cipher round unit 120 but may do so in a different encoding.

Figure 2:
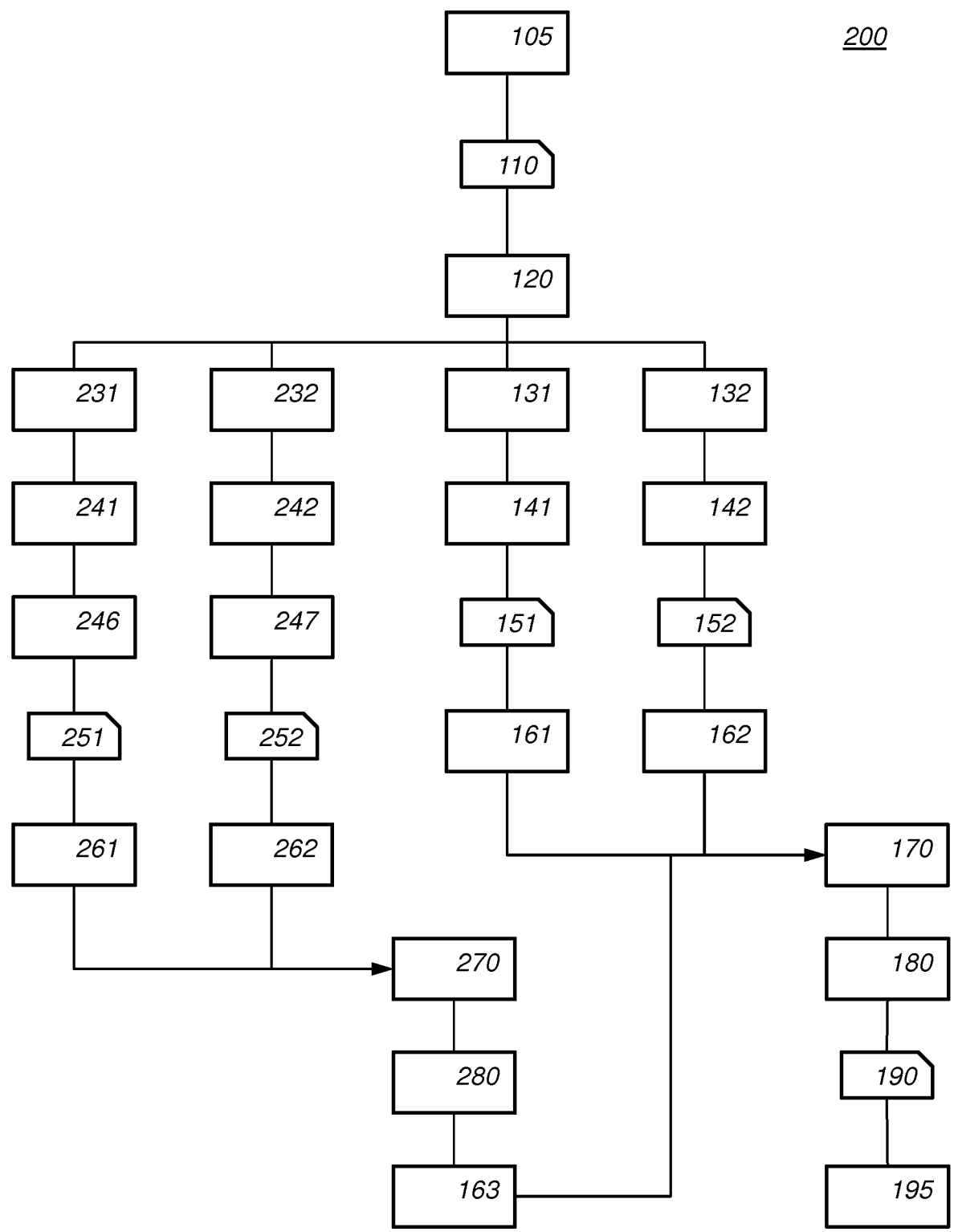

FIG. 2 schematically shows an example of an embodiment of a cryptographic device 200. As in FIG. 1a, FIG. 2 shows the computation of three intermediate block cipher results. Two of the intermediate block cipher result are computed in the same way as in FIG. 1a, using two branches: 131-161 and 132-162, that each compute an intermediate block cipher result. To compute the third intermediate block cipher result a more complicated approach is used.

Device 200 computes a plurality of further intermediate block cipher results, shown are results 251, 252. These further intermediate block cipher results are averaged using further averaging functions in further averaging function units 261, 262. However, the further intermediate block cipher results 251, 252 that enter the further averaging functions are not the same as the intermediate block cipher results 151 and 152 that enter the averaging function units 161 and 162, not even under the encoding.

Device 200 comprises final block cipher round units; shown are units 231 and 232, these compute the same block cipher rounds as unit 131. Following the final block cipher round units an additional block cipher round unit is applied; shown are additional block cipher round units 241 and 242. These units compute the same block cipher rounds as unit 141. However, different from the branches 131-161 and 132-162, following the additional block cipher round units 241 and 242 there is a further additional block cipher round unit, shown are units 246 and 247. The results of the further additional block cipher round units are the further plurality of intermediate block cipher results.

Device 200 comprises further averaging function units implementing a further plurality of averaging functions. These functions are applied to the further plurality of intermediate block cipher results. The further plurality of averaging functions having been selected so that their function-sum equals the identity function. Device 200 comprises an adding unit 270 configured to add the results of the further plurality of averaging functions. If no faults occurred the outcome of adding unit 270 is the same as the outcome of, say, further additional block cipher round unit 246.

Device 200 comprises an inverse further additional block cipher round unit 280 configured to apply the inverse of the rounds of further additional block cipher round unit 246 to the result of the addition. If there are no errors, the result is an intermediate block cipher result. An averaging function unit 163 is applied to the result of the addition. The averaging function units 161, 162, and 163 are selected so that their function-sum is the identity.

In the various embodiments of devices 100, 101, 102, and 200, the input interface may be selected from various alternatives. For example, the input interface may be a network interface to a local or wide area network, e.g., the Internet, a storage interface to an internal or external data storage, a keyboard, an application interface (API), etc. The output interface may be corresponding, e.g., a network interface to a local or wide area network, e.g., the Internet, a storage interface to an internal or external data storage, a keyboard, an application interface (API), etc. The output interface may also be display, a printer, etc.

Devices 100, 101, 102, and 200 may have a user interface, which may include well-known elements such as one or more buttons, a keyboard, display, touch screen, etc. The user interface may be arranged for accommodating user interaction for performing a block cipher action, e.g., an encryption or decryption, e.g. to stored or received data at the device.

Storage 110 may be implemented as an electronic memory, say a flash memory, or magnetic memory, say hard disk or the like. Storage 110 may comprise multiple discrete memories together making up storage 110. Storage 110 may also be a temporary memory, say a RAM. In the case of a temporary storage 110, storage 110 contains some means to obtain data before use, say by obtaining them over an optional network connection (not shown).

Typically, the devices 100, 101, 102, 200 each comprise a microprocessor (not separately shown) which executes appropriate software stored at the device; for example, that software may have been downloaded and/or stored in a corresponding memory, e.g., a volatile memory such as RAM or a non-volatile memory such as Flash (not separately shown). Alternatively, the devices may, in whole or in part, be implemented in programmable logic, e.g., as field-programmable gate array (FPGA). The devices may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

In an embodiment, a device may comprise an input interface circuit, an initial block cipher round unit circuit, two or more final block cipher round unit circuit, two or more additional block cipher round unit circuit, two or more an averaging function unit circuit, an adding unit circuit, an inverse additional block cipher round unit circuit, an output interface circuit. An embodiment may also comprise, two or more further additional block cipher rounds unit circuit, two or more a further averaging function unit circuit, a further adding unit circuit, an inverse further additional block cipher round unit circuit, etc. The circuits implement the corresponding units described herein. The circuits may be a processor circuit and storage circuit, the processor circuit executing instructions represented electronically in the storage circuits.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only.

Figure 3:
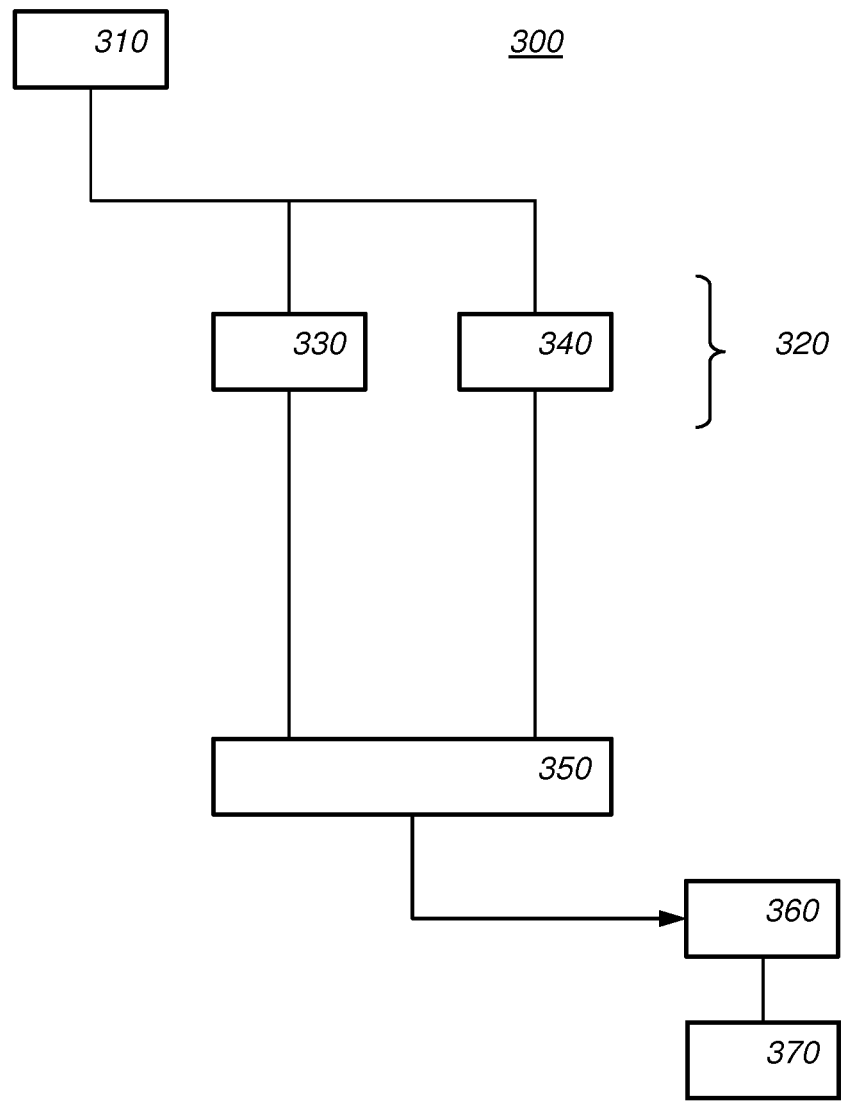

FIG. 3 schematically shows an example of an embodiment of a cryptographic method 300. Method 300 is a cryptographic method arranged to compute a block cipher on an input message 110. Method 300 could be executed on an electronic device, e.g., a computer and/or a device such as device 100, 101, 102, or 200. The block cipher comprises a plurality block cipher rounds. Method 300 comprises

- receiving 310 an input message, e.g., over an input interface, for example the input message could be received from a computer program, e.g., which uses the block cipher, e.g., for encryption or decryption,
- computing 320 a plurality of intermediate block cipher results. The intermediate block cipher results are computed in a number of branches which can be independent from each other. In each branch, an intermediate block cipher result is computed. Method 300 comprises a first branch in which a first intermediate block cipher result is computed. Method 300 comprises applying 330 the plurality of block cipher rounds sequentially to the input message followed by one or more additional block cipher rounds. Further intermediate block cipher results are computed in further branches. Method 300 comprises re-computing 340 at least one of the final block cipher rounds of the plurality block cipher rounds followed by the one or more additional block cipher rounds. Increasing the number of re-computations, increases the security.
- apply 350 a plurality of averaging functions to the plurality of intermediate block cipher results, the plurality of averaging functions having been selected so that their function-sum equals the identity function,
- add 360 the results of the plurality of averaging functions, and
- apply 370 the inverse of the one or more additional block cipher rounds, a block cipher result 190 being obtained from the result of said inverse.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, some or all of the different branches may be executed, at least partially, in parallel. Moreover, a given step may not have finished completely before a next step is started.

A method according to the invention may be executed using software, which comprises instructions for causing a processor system to perform method 300. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. A method according to the invention may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into sub-routines and/or be stored in one or more files that may be linked statically or dynamically. Another embodiment relating to a computer program product comprises computer executable instructions corresponding to each of the means of at least one of the systems and/or products set forth.

Below further embodiments are discussed, which may be implemented on electronic devices. Embodiments disclosed below include one or more of the following features:

1. the calculation is split into multiple branches, each branch containing the rounds that are susceptible to a DFA attack;
2. the variables in each branch are encoded separately, different branches should use different encodings, so that it is not obvious which rounds in different branches are the same;
3. in each branch, dummy rounds, i.e. pairs of two consecutive rounds that are each other's inverse, may be inserted between the normal rounds;
4. in each branch, additional rounds are executed, in order to achieve diffusion of the injected fault, e.g. full diffusion over all bytes;
5. branches that have executed the same rounds are 'averaged'; their bytes are combined in such a way that if no error was injected in any of these branches and all these branches have calculated the same result (in different encodings), the result of the averaging is another encoding of this same result;
6. after averaging, the additional rounds are inverted until the output is obtained.

The effect of steps 5 and 6 is that, unless exactly the same fault has been injected in all instances of a round that is susceptible to a DFA attack, the attacker will not see a change in output that he expects, and the DFA as explained with respect to FIG. 4 will not work. In other words, if there are n branches that contain the DFA-sensitive round, the attacker must inject the right faults in each of these branches. FIG. 5a gives an embodiment in which two branches are used, as well as one additional round $R_{10}$. FIG. 5b gives a more elaborate example in which five branches are used, as well as three additional round functions $R_{10}$, $R_{11}$ and $R_{12}$. A couple of dummy rounds ($R_d$ and its inverse) were also inserted in one of the branches.

FIG. 5a illustrates an embodiment for which two faults must be injected in a DFA attack. Starting with round 7, the calculation is performed twice, using different encodings. The encodings are not indicated in the figure. This means that $x_7 = R_7(x_6)$ is the same as $x'_7$. The additional round $R_{10}$ must, together with the MixColumns in round 8 spread the effect of an error injected in $x_7$ or $x'_7$ over all bytes of $x_{10}$ or $x'_{10}$—remember that in AES-128, $R_9$ does not use MixColumns and hence moves the effect of error but does not spread it over multiple bytes. A good choice is to pick a random k and let $R_{10}(x) = \text{MixColumns}(\text{ShiftRows}(\text{SubBytes}(x \oplus k)))$. If no fault is injected, this circuit calculates the same output as the circuit from FIG. 4. The results from the two branches, denoted $x_{10}$ and $x'_{10}$, are averaged to $x_{11} = A(x_{10}) \oplus x'_{10} \oplus A(x'_{10})$, where A is an arbitrary invertible mapping on the state space mapping with the property that $I \oplus A$, where I denotes the identity mapping, is invertible as well. Then $x_{11} = x_{10}$ if and only if $x_{10} = x'_{10}$, which implies that the same fault must have been injected into both branches.

FIG. 5b illustrates a more elaborate embodiment for which five faults must be injected in a DFA attack. The results after round 12 from two branches are combined using the invertible mappings A and $I \oplus A$, the inverse of $R_{12}$ is applied and the result from this action is combined with the results from three other branches using the distinct invertible mappings B, C, D, and $I \oplus B \oplus C \oplus D$. Finally rounds 11 and 10 are inverted to obtain the output.

Figure 6A:
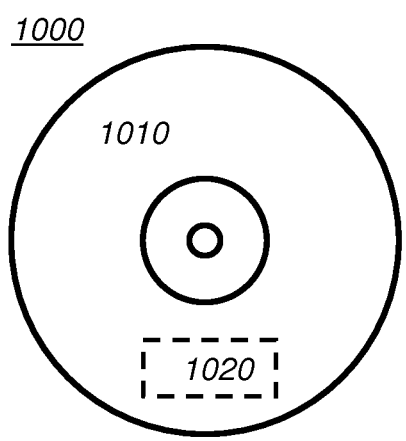

FIG. 6a shows a computer readable medium 1000 having a writable part 1010 comprising a computer program 1020, the computer program 1020 comprising instructions for causing a processor system to perform a method to compute a block cipher, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said method to compute a block cipher.

Figure 6B:
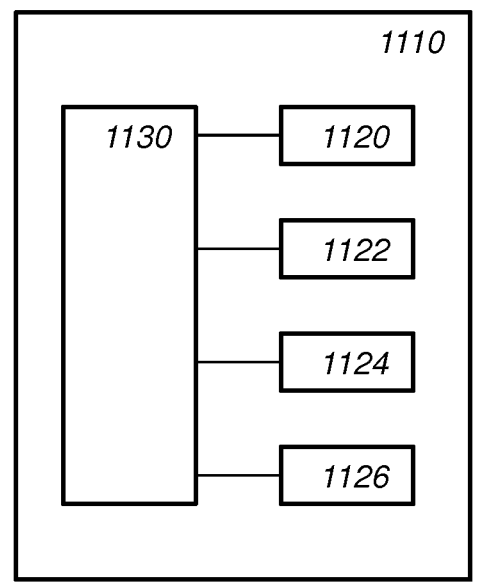

FIG. 6b shows in a schematic representation of a processor system 1140 according to an embodiment of a cryptographic device to compute a block cipher. The processor system comprises one or more integrated circuits 1110. The architecture of the one or more integrated circuits 1110 is schematically shown in FIG. 6b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, the device to compute a block cipher may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex M0. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. A cryptographic device comprising:
   an input interface circuit that receives an input message,
   a processor circuit that applies a plurality of block cipher rounds to the input message to provide a block cipher of the input message,
      wherein the plurality of block cipher rounds comprises a first set of block cipher rounds and a second set of block cipher rounds;
   wherein, to provide the block cipher of the input message, the processor circuit:
      applies the first set of block cipher rounds sequentially to the input message to obtain a first block cipher result,
      computes a plurality of block cipher outputs from the first block cipher result,
      wherein, to obtain each block cipher output of the plurality of block cipher outputs, the processor circuit:
         applies the second set of one or more block cipher rounds to the first block cipher result to obtain a second block cipher result,
         applies a set of one or more additional block cipher rounds to the second block cipher result to obtain an intermediate block cipher result,
         applies an averaging function of a plurality of averaging functions to each intermediate block cipher result to provide the output of each block cipher output,
            wherein a function-sum of the plurality of averaging functions equals the identity function,
      combines each output of the plurality of averaging functions to provide a composite average, and
      applies an inverse of the set of one or more additional block cipher rounds to the composite average to obtain the block cipher of the input message, and
   an output interface circuit that outputs the block cipher of the input message;
   wherein each set of additional block cipher rounds used to obtain each intermediate block cipher result performs the same cipher function as each other set of additional block cipher rounds,
   wherein each second set of block cipher rounds used to obtain each second block cipher result performs the same cipher function as each other second set of block cipher rounds,
   wherein each second set of block cipher rounds used to obtain each second cipher result differs in embodiment than each other second set of block cipher rounds.

2. The cryptographic device of claim 1, wherein at least one additional block cipher round is obtained from a block cipher round of the plurality of block cipher rounds by changing a round key of the block cipher round.

3. The cryptographic device of claim 1, wherein at least one of the plurality of averaging functions is invertible.

4. The cryptographic device of claim 1, wherein at least one block cipher output of the plurality of block cipher outputs comprises multiple data-elements, and
   wherein a corresponding averaging function processes the at least one block cipher output component-wise on the data-elements.

5. The cryptographic device of claim 1, wherein at least one averaging function is linear.

6. The cryptographic device of claim 1, wherein all but one of the plurality of averaging functions have been selected randomly from a larger set of averaging functions, and wherein a final averaging function determines a function-difference of the identity function and the selected averaging functions.

7. The cryptographic device of claim 1, wherein applying the plurality of second block cipher rounds comprises applying one or more dummy rounds.

8. The cryptographic device of claim 1, wherein at least one of the intermediate block cipher results is computed on encoded variables, said variables not being jointly encoded.

9. The cryptographic device of claim 1, wherein the plurality of intermediate block cipher results are encoded, and wherein the plurality of intermediate block cipher results are equal under the encoding.

10. The processing circuit of claim 1,
    wherein at least one set of the set of additional block cipher rounds comprises a set of further additional block cipher rounds,
    wherein, to obtain each output of the further set of further additional block cipher rounds, the processor circuit further:
       applies the further additional block cipher rounds to the further cipher result to obtain a further cipher result,
       applies an averaging function of a plurality of further averaging functions to each further cipher result,
          wherein a function-sum of the further averaging functions equals the identify function, combines each output of the plurality of further averaging functions to provide a further composite average, and applies a further inverse of the further set of additional block cipher rounds to the further composite average to obtain the output of the further set of additional cipher rounds.

11. A method comprising:

receiving an input message into a memory circuit, and applying, via a processor, a plurality of block cipher rounds to the input message to provide a block cipher of the input message;

outputting the block cipher of the input message;

wherein the plurality of block cipher rounds comprises a first set of block cipher rounds and a second set of block cipher rounds;

wherein, to provide the block cipher of the input message, the method comprises:

applying the first set of block cipher rounds sequentially to the input message to obtain a first block cipher result, computing a plurality of block cipher outputs from the first block cipher result, wherein, to obtain each block cipher output of the plurality of block cipher outputs, the method comprises:

applying the second set of one or more block cipher rounds to the first block cipher result to obtain a second block cipher result, applying a set of one or more additional block cipher rounds to the second block cipher result to obtain each block cipher output of the plurality of block cipher outputs, applying an averaging function of a plurality of averaging functions to each block cipher output of the plurality of block cipher outputs, combining each output of the plurality of averaging functions to provide a composite average, and applying an inverse of the set of one or more additional block cipher rounds to the composite average to obtain the block cipher of the input message;

wherein the first set of block cipher rounds and the second set of block cipher rounds comprise a plurality of block cipher rounds, wherein each set of additional block cipher rounds used to obtain each block cipher output performs the same cipher function as each other set of additional block cipher rounds, wherein each second set of block cipher rounds used to obtain each second cipher result performs the same cipher function as each other second set of block cipher rounds, wherein each second set of block cipher rounds used to obtain each second cipher result differs in embodiment than each other second set of block cipher rounds, and wherein a function-sum of the plurality of averaging functions equals the identity function.

12. A non-transitory computer-readable medium that contains a program that, when executed by a processing system:

receives an input message, applies a plurality of block cipher rounds to the input message to provide a block cipher of the input message, wherein the plurality of block cipher rounds comprises a first set of block cipher rounds and a second set of block cipher rounds;

wherein, to provide the block cipher of the input message, the processing system:

applies the first set of block cipher rounds sequentially to the input message to obtain a first block cipher result, computes a plurality of block cipher outputs from the first block cipher result, wherein, to obtain each block cipher output of the plurality of block cipher outputs, the processing system:

applies the second set of one or more block cipher rounds to the first block cipher result to obtain a second block cipher result, applies a set of one or more additional block cipher rounds to the second block cipher result to obtain each block cipher output of the plurality of block cipher outputs;

applies an averaging function of a plurality of averaging functions to each block cipher output of the plurality of block cipher outputs, combines each output of the plurality of averaging functions to provide a composite average, and applies an inverse of the set of one or more additional block cipher rounds to the composite average to obtain the block cipher of the input message, and outputs the block cipher of the input message;

wherein the first set of block cipher rounds and the second set of block cipher rounds comprise a plurality of block cipher rounds, wherein each set of additional block cipher rounds used to obtain each block cipher output performs the same cipher function as each other set of additional block cipher rounds, wherein each second set of block cipher rounds used to obtain each second cipher result performs the same cipher function as each other second set of block cipher rounds, wherein each second set of block cipher rounds used to obtain each second cipher result differs in embodiment than each other second set of block cipher rounds, and wherein a function-sum of the plurality of averaging functions equals the identity function.

13. The medium of claim 12, wherein at least two sets of the set of additional block cipher rounds comprise a set of further additional block cipher rounds, wherein, to obtain an output of the further set of further additional block cipher rounds, the program causes the processing system to:

apply the further additional block cipher rounds to the further cipher result to obtain a further cipher result, apply an averaging function of a plurality of further averaging functions to each further cipher result, wherein a function-sum of the further averaging functions equals the identify function, combine each output of the plurality of further averaging functions to provide a further composite average, and apply a further inverse of the further set of additional block cipher rounds to the further composite average to obtain the output of the at least two sets of the additional block cipher rounds.

14. A apparatus comprising:

an input element;

at least one first block cipher element;

a plurality of second block cipher elements;

a plurality of additional block cipher elements;

a plurality of averaging elements;

a combining element;

an inversion element; and
an output element;
wherein the input element is coupled to the at least one first block cipher element;
wherein each of the at least one block cipher element is coupled to the plurality of second block cipher elements;
wherein each second block cipher element of the plurality of second block cipher elements is coupled to a corresponding additional block cipher element of the plurality of additional block cipher elements;
wherein each additional block cipher element is coupled to a corresponding averaging element in the plurality of averaging elements;
wherein each of the averaging elements is coupled to the combining element;
wherein the combining element is coupled to the inversion element;
wherein the inversion element is coupled to the output element;
wherein the input element receives an input message;
wherein the first block cipher element applies a first block cipher to the input message to provide a first block cipher result;
wherein each of the second block cipher elements applies a second block cipher to the first block cipher result to provide an intermediate block cipher result;
wherein each of the additional block cipher elements applies an additional block cipher to the intermediate block cipher result to provide an additional block cipher result;
wherein each averaging element applies an averaging function to the additional block cipher result to provide an averaged block cipher result;
wherein the combining element combines the averaged block cipher result from the plurality of averaging elements to provide a combined block cipher result;
wherein the inversion element applies an inversion function to the combined block cipher result to produce a block cipher of the input message;
wherein the output element outputs the block cipher of the input message;
wherein each of the second block cipher elements applies a same second block cipher to the first block cipher result;
wherein each of the second block cipher elements is embodied differently than each other second block cipher element;
wherein each of the additional block cipher elements applies a same additional block cipher to the intermediate block cipher result;
wherein a function-sum of the plurality of averaging functions comprises an identity function, and
wherein the inversion function is an inverse of the additional block cipher.

15. The apparatus of claim 14,
wherein a subset of two or more additional block cipher elements further comprise a plurality of additional elements;
wherein the plurality of additional elements comprises:
a plurality of second additional block cipher elements;
a plurality of second averaging elements;
a second combining element;
a second inversion element; and
a third averaging element;
wherein each averaging element of the subset of additional block cipher elements is coupled to a corresponding second additional block cipher element of the plurality of second additional block cipher elements;
wherein each second additional block cipher element is coupled to a corresponding second averaging element of the plurality of second averaging elements;
wherein the plurality of second averaging elements are coupled to the second combining element;
wherein the second combining element is coupled to the second inversion element;
wherein the third averaging element is coupled to the second inversion element;
wherein each second additional block cipher element applies a second additional block cipher to each additional block cipher result of the subset of additional block cycle elements to provide a second additional block cipher result;
wherein each second averaging element applies a second averaging function to each second additional block cipher result to provide a second averaged block cipher result;
wherein the second combining element combines the second additional block cipher results to provide a second combined block cipher result;
wherein the second inversion element applies an inverse function of the second additional block cipher to provide a second block cipher result;
wherein the third averaging element applies a third averaging function to the second block cipher result to provide the combined block cipher result of the subset of additional block cipher elements;
wherein each of the second additional block cipher elements applies the same second additional block cipher to the second additional block cipher result; and
wherein a second function-sum of the second averaging functions comprises the identity function.

16. The apparatus of claim 14, wherein the averaging function of at least one of the plurality of averaging elements is invertible.

17. The apparatus of claim 14, wherein the averaging function of at least one of the plurality of averaging elements is linear.

18. The apparatus of claim 14, wherein all but one of the averaging functions of the plurality of averaging elements are selected randomly from a larger set of averaging functions, and wherein the averaging function of a final averaging element determines a function-difference of the identity function and the selected averaging functions.

19. The apparatus of claim 14, wherein each of the second block cipher elements comprises one or more dummy block cipher rounds.

20. The apparatus of claim 14, wherein each of the additional block cipher elements comprises one or more dummy block cipher rounds.

* * * * *